United States Patent
Mester et al.

(10) Patent No.: US 7,305,042 B2
(45) Date of Patent: Dec. 4, 2007

(54) T1 RADIO HAVING CODING GAIN ADJUSTABLE FOR NUMBER OF CHANNELS

(75) Inventors: Timothy G. Mester, Huntsville, AL (US); Matthew A. Kliesner, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 665 days.

(21) Appl. No.: 10/839,491

(22) Filed: May 5, 2004

(65) Prior Publication Data

US 2005/0249308 A1 Nov. 10, 2005

(51) Int. Cl.
*H04L 27/10* (2006.01)
(52) U.S. Cl. ..................................... 375/281
(58) Field of Classification Search ............... 375/308, 375/281
See application file for complete search history.

(56) References Cited

U.S. PATENT DOCUMENTS

2002/0040383 A1* 4/2002 Zehavi ....................... 709/200
2002/0120904 A1* 8/2002 Hekstra ...................... 714/786

* cited by examiner

*Primary Examiner*—Vu Le
*Assistant Examiner*—Michael Neff
(74) *Attorney, Agent, or Firm*—Allen, Dyer, Doppelt, Milbrath & Gilchrist, P.A.

(57) ABSTRACT

A communication system for transmitting (T1) digital communication signals between a transmit site and a receiver site includes an M:1 multiplexer, coupled to a rate 1/N convolutional encoder, which is operative to output an encoded output signal modulated in quaternary phase shift keyed (QPSK) space having a prescribed symbol rate. The receive site has a rate 1/N Viterbi decoder which is operative to decode the encoded output signal output by the rate 1/N convolutional encoder, and a 1:M demultiplexer having an input coupled to the Viterbi decoder and M plurality of outputs, and being operative to demultiplex the decoded signal from the Viterbi decoder into a plurality of M time division multiplexed digital communication signals. For any selected values for of M and N, the product of M and N is constant.

4 Claims, 2 Drawing Sheets

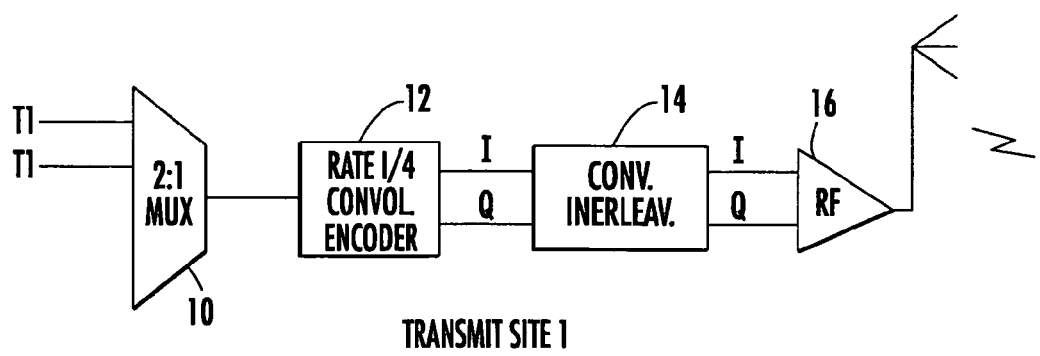
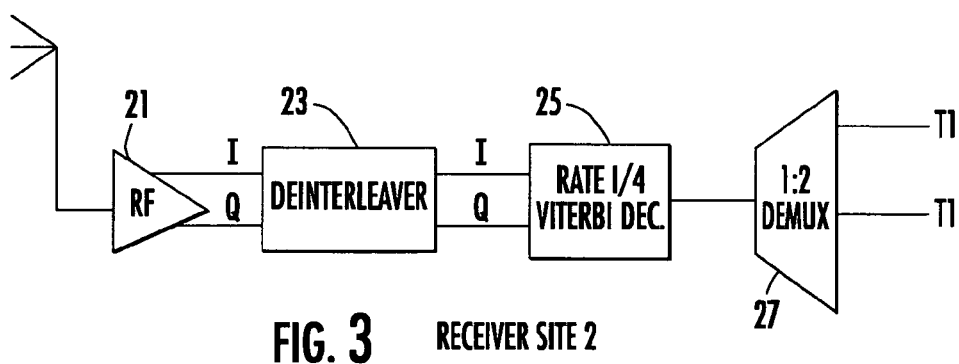
FIG. 3  RECEIVER SITE 2
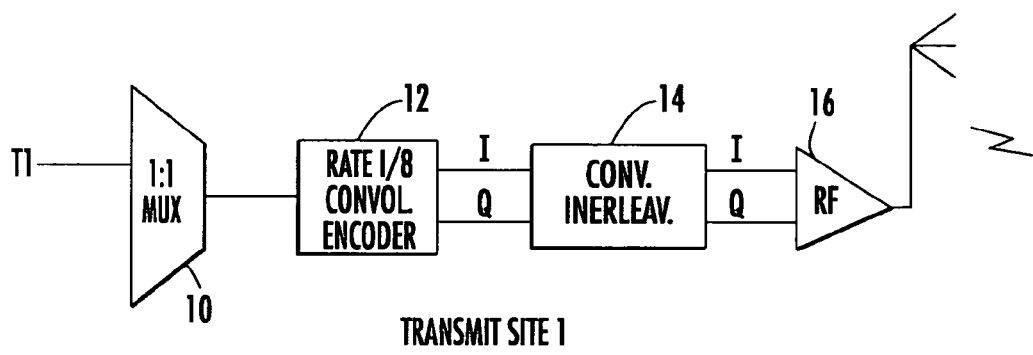
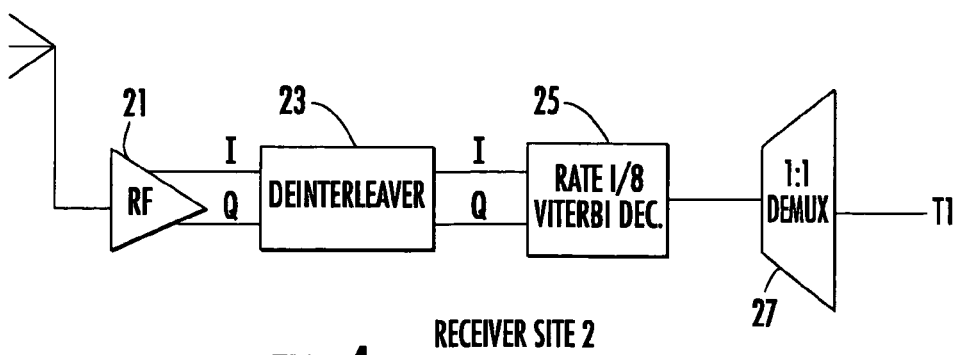
FIG. 4

US 7,305,042 B2

T1 RADIO HAVING CODING GAIN ADJUSTABLE FOR NUMBER OF CHANNELS

FIELD OF THE INVENTION

The present invention relates in general to communication systems and subsystems therefor, and is particularly directed to a T1 radio architecture that can accommodate variations in the number of T1 input channels to be transmitted without suffering a loss in performance (gain distance and fade margin).

BACKGROUND OF THE INVENTION

FIG. 1 diagrammatically illustrates the overall configuration of a conventional multi T1 radio at a transmit site 1, and comprising a multiplexer 10 to which a plurality of T1 channels (e.g., 4 in the illustrated example) are applied. For the sake of simplicity, let it be assumed that each channel is a 1.544 Mbps channel. The output of multiplexer 10 is coupled to a rate ½ convolutional encoder 12, the output of which is encoded into IQ space (QPSK) and coupled through a convolutional interleaver 14 for application to an RF unit 16, from which the encoded data stream is wirelessly transmitted to a receiver site 2. At the receiver site 2, the wirelessly transmitted modulation is downconverter to baseband by an RF front end 21 and then supplied to a deinterleaver 23 for application to a rate ½ Viterbi decoder 25. The output of the Viterbi decoder is coupled to a demultiplexer 27 from which the T1 data is demultiplexed.

In the example, convolutional encoder 12 being a rate ½ encoder implies that two bits are transmitted for each input bit, so that in the QPSK constellation space, there is an effective symbol rate of 6.44 M symbols/sec. At the receive end of the link, the output of the rate ½ Viterbi decoder 25 is a 6.44 Mbps data stream that is coupled to demultiplexer 27, from which the four original T1 channels are recovered. Where it is desired to transmit a different number of T1 channels, it has been traditional practice to employ a different radio whose parameters are defined for the purpose, and which contains the appropriate replacement filter set.

SUMMARY OF THE INVENTION

In accordance with the present invention, the need to employ a replacement radio is effectively circumvented by making communication control parameters of the components of the T1 system of FIG. 1 mutually adjustable. In particular, the multiplexer and demultiplexer ratios of M:1 and 1:M, respectively, vary with respect to the coding gain parameter of 1/N, such that the product M*N remains a constant. Thus for the case of handling four T1 links, M=4 and N=2, which reduces to the architecture of FIG. 1, described above. In accordance with the present invention, however, both M and N are variable parameters making it possible to transmit a different number of T1 channels with different levels of performance. Namely, the desire to transmit a different number of T1 channels, the same radio may be employed without having to replace filters to adjust the bandwidth of the radio. All that needs to be changed is the coding gain. Thus, with the same radio two T1 s may be transmitted by setting M=2 and N=4. Likewise a single T1 may be transmitted by setting M=1 and N=8. Namely by making the product of the multiplexing ratio and coding gain constant, the invention provides a common design of radio hardware and signal filters which is capable of supporting a variable number of T1 channels without a loss of sensitivity. At lower rate codes (e.g., ¼ and ⅛) sensitivity is actually improved. Such system gain translates into more link margin or longer link transport distance.

BRIEF DESCRIPTION OF THE DRAWINGS

FIG. 3 shows the coding gain adjustable T1 radio of FIG. 2 for transmitting a pair of T1 channels with a coding rate of ¼; and FIG. 4 shows the coding gain adjustable T1 radio of FIG. 2 for transmitting a single T1 channel with a coding rate of ⅛.

DETAILED DESCRIPTION

Figure 1:
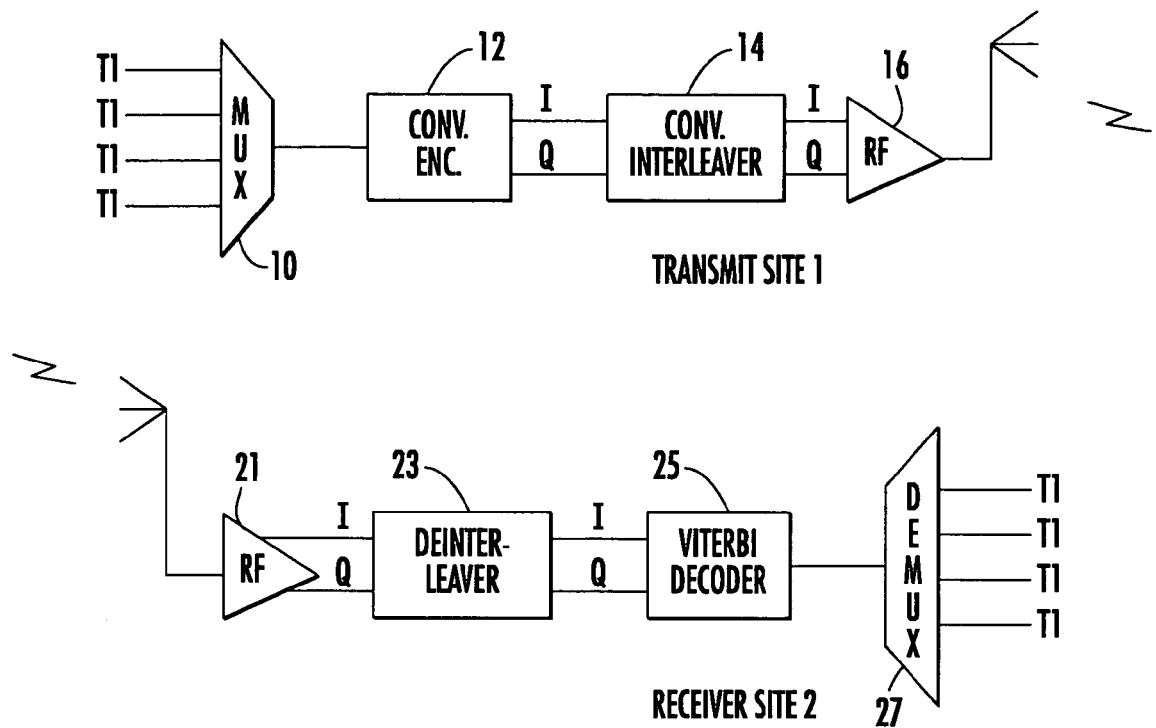
FIG. 1 diagrammatically illustrates the overall configuration of a conventional multi T1 radio.

Before describing the coding gain adjustable T1 radio in accordance with the present invention, it should be observed that the invention resides primarily in a modular arrangement of conventional communication electronic circuits and electronic signal processing circuits and components therefor. In a practical implementation that facilitates packaging in a hardware-efficient equipment configuration, these modular arrangements may be readily implemented as field programmable gate array (FPGA)-, or application specific integrated circuit (ASIC)-based chip sets. Consequently, the configuration of such an arrangement of circuits and components and the manner in which they are interfaced with one another have, for the most part, been illustrated in the drawings in readily understandable block diagram format, which show only those specific details that are pertinent to the present invention, so as not to obscure the disclosure with details which will be readily apparent to those skilled in the art having the benefit of the description herein. The block diagram illustrations are primarily intended to show the components of the invention in a convenient functional grouping, whereby the present invention may be more readily understood.

Figure 2:
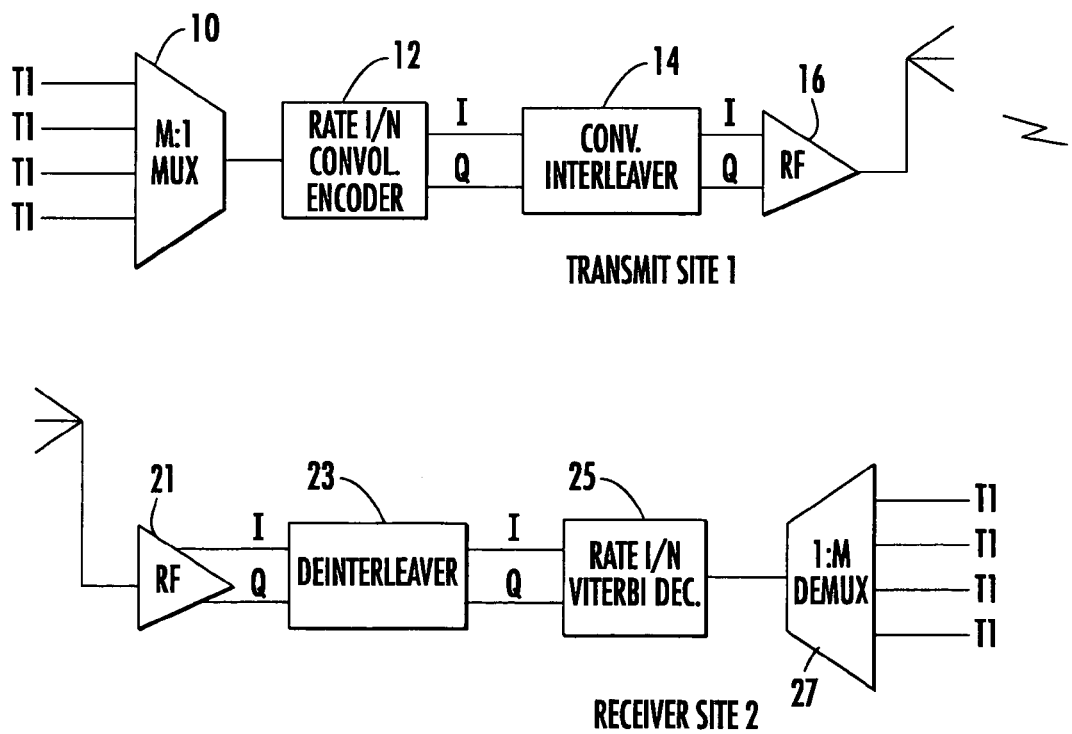
FIG. 2 is a block diagram of the coding gain adjustable T1 radio in accordance with the present invention.

Attention is initially directed to FIG. 2, which is an overall block diagram of the coding gain adjustable T1 radio in accordance with the present invention. As shown there, similar to the radio architecture of FIG. 1 at a transmit site 1, there is an M:1 multiplexer 10 to which a plurality of T1 channels are applied. For the sake of simplicity, it will again be assumed that each channel is a 1.544 Mbps channel. The output of M:1 multiplexer 10 is coupled to a rate 1/N convolutional encoder 12, the output of which is encoded into IQ space (QPSK) and coupled through a convolutional interleaver 14 for application to an RF unit 16, from which the encoded data stream is wirelessly transmitted to receiver site 2. At the receiver site 2, the wirelessly transmitted modulation is downconverter to baseband by an RF front end 21 and then supplied to a deinterleaver 23 for application to a rate 1/N Viterbi decoder 25. The output of the Viterbi decoder 25 is coupled to a 1:M demultiplexer 27 from which the T1 data is demultiplexed. With respect to the operation of the rate 1/N convolutional encoder, and the rate 1/N Viterbi decoder, it should be noted that by rate 1/N is meant that for one information bit, N coded bits are transmitted. Thus, for example, an R=½ code means that for one information bit, two coded bits are sent; similarly, for an R=⅛ code, eight coded bits are sent for each information bit.

Where M=4 and N=2, the embodiment of FIG. 2 reduces to the architecture of FIG. 1, described above. In accordance with the present invention, however, both M and N are variable parameters making it possible to transmit a different number of T1 channels with different levels of performance. Namely, the desire to transmit a different number of T1 channels, the same radio may be employed without having to replace filters to adjust the bandwidth of the radio. All that needs to be changed is the coding gain.

FIG. 3, for example, shows the case of transmitting a pair of T1 channels, which are coupled to (M=2:1) multiplexer 10, the output of which is coupled to convolutional encoder 12. To maintain the 6.44 M symbols/sec transport rate, the gain of encoder is changed to rate $\frac{1}{4}$—implying the transmission of four bits for every input bit. Therefore, as in the embodiment of FIG. 1, 6.44 M symbols/sec are transmitted over the wireless communication link to the receiver site. At the receiver site, Viterbi decoder is now operated as a rate $\frac{1}{4}$ decoder, the output of which is coupled to (1:M=2) demultiplexer 27, which outputs the two original T1 channels.

FIG. 4 shows the case of a single T1 channel being applied to the input multiplexer 10, which now operates as an M=1 multiplexer, and the output of which is coupled to convolutional encoder 12. In order to maintain the desired 6.44 M symbols/sec transport rate, it is necessary to change the coding gain of convolutional encoder to rate $\frac{1}{8}$, which implies the transmission of eight bits for every input bit. As in the embodiments of FIGS. 2 and 3, 6.44 M symbols/sec are transmitted over the wireless communication channel to the receiver site. At the receiver site, the Viterbi decoder is now operated as a rate $\frac{1}{8}$ decoder, so that output multiplexer will recover the original T1 channel.

From the foregoing it will be appreciated that a common design of radio hardware and signal filters can be used to support a variable number of T1 channels without a loss of sensitivity. Indeed, at lower rate codes (e.g., $\frac{1}{4}$ and $\frac{1}{8}$) sensitivity is actually improved. As noted earlier, such system gain translates into more link margin or longer link transport distance.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. A communication system for transmitting digital communication signals between a transmit site and a receiver site comprising:
   at said transmit site,
   an M:1 multiplexer, wherein M is variable, having an M plurality of inputs coupled to receive up to M time division multiplexed digital communication signals;
   a rate 1/N convolutional encoder, where N is variable, coupled to the output of said multiplexer and being operative to output an encoded output signal modulated in quaternary phase shift keyed (QPSK) space having a prescribed symbol rate;
   at said receiver site,
   a rate 1/N Viterbi decoder which is operative to decode the encoded output signal output by said rate 1/N convolutional encoder;
   a 1:M demultiplexer having an input coupled to said Viterbi decoder and M plurality of outputs, and being operative to demultiplex the decoded signal from said Viterbi decoder into a plurality of M time division multiplexed digital communication signals, and wherein
   for any selected values for of M and N, the product of M and N is constant.

2. A transmitter subsystem for transmitting digital communication signals from a transmit site to a receiver site comprising:
   an M:1 multiplexer, wherein M is variable, having an M plurality of inputs coupled to receive up to M time division multiplexed digital communication signals;
   a rate 1/N convolutional encoder, where N is variable, coupled to the output of said multiplexer and being operative to output an encoded output signal modulated in quaternary phase shift keyed (QPSK) space having a prescribed symbol rate;
   an interleaver coupled to interleave I and Q outputs of said rate 1/N convolutional encoder;
   an RF transmitter coupled to transmit interleaved I and Q outputs supplied thereto by said interleaver, and wherein
   for any selected values for of M and N, the product of M and N is constant.

3. A receiver subsystem for receiving digital communication signals that have been transmitted from a transmit site to a receiver site comprising:
   an RF front end which is operative to receive an RF signal encoded modulated in quaternary phase shift keyed (QPSK) space having a prescribed symbol rate;
   a rate 1/N Viterbi decoder which is operative to decode the received encoded output signal output by said RF front end;
   a 1:M demultiplexer having an input coupled to said Viterbi decoder and M plurality of outputs, and being operative to demultiplex the decoded signal from said Viterbi decoder into a plurality of M time division multiplexed digital communication signals, and wherein
   for any selected values for of M and N, the product of M and N is constant.

4. A method of increasing the wireless transport distance of digital communication signals transmitted from a transmit site comprising the steps of:
   (a) coupling said digital communication signals to one input of an M:1 multiplexer, wherein M is a variable greater than one, having an M plurality of inputs capable of receiving up to M time division multiplexed digital communication signals;
   (b) coupling the output of said M:1 multiplexer to a rate 1/N convolutional encoder, where N is variable, said encoder being operative to output an encoded output signal modulated in quaternary phase shift keyed (QPSK) space having a prescribed symbol rate;
   (c) transmitting the output of said rate 1/N convolutional encoder to a receive site, and wherein
   for any selected values for of M and N, the product of M and N is constant.

* * * * *